(12) United States Patent
Andreas-Schott et al.

(10) Patent No.: US 7,238,441 B2
(45) Date of Patent: Jul. 3, 2007

(54) INTEGRATED BUS BARS FOR A FUEL CELL

(75) Inventors: Benno Andreas-Schott, Pittsford, NY (US); Stephen Raiser, Egelsbach (DE)

(73) Assignee: General Motors Corporation, Detroit, MI (US)

( * ) Notice: Subject to any disclaimer, the term of this patent is extended or adjusted under 35 U.S.C. 154(b) by 120 days.

(21) Appl. No.: 11/011,234

(22) Filed: Dec. 14, 2004

(65) Prior Publication Data
US 2006/0127730 A1 Jun. 15, 2006

(51) Int. Cl.
*H01M 8/02* (2006.01)
(52) U.S. Cl. .......................................... 429/34; 429/38
(58) Field of Classification Search .................. 429/34, 429/38, 178
See application file for complete search history.

(56) References Cited

U.S. PATENT DOCUMENTS

| | | | | |
|---|---|---|---|---|
| 4,758,481 A | * | 7/1988 | Fauvel | 429/34 X |
| 6,632,556 B2 | * | 10/2003 | Guthrie et al. | 429/34 |
| 6,663,995 B2 | * | 12/2003 | Rock | 429/34 |
| 2002/0187382 A1 | * | 12/2002 | Nishiumi et al. | 429/34 |
| 2004/0247987 A1 | * | 12/2004 | Izumi et al. | 429/38 X |

* cited by examiner

*Primary Examiner*—Stephen J. Kalafut
(74) *Attorney, Agent, or Firm*—Charles H. Ellerbrock

(57) ABSTRACT

A fuel cell system having an integral electrical conduction system is provided for the transmission of electrical energy created from a fuel cell stack. The electrical conduction system conducts electricity to a positive and a negative pole, each disposed at a common end of the fuel cell stack for reducing the amount of external wiring needed for connecting multiple fuel cell stacks together. The fuel cell stack and electrical system are both disposed in a housing.

11 Claims, 3 Drawing Sheets

INTEGRATED BUS BARS FOR A FUEL CELL

FIELD OF THE INVENTION

The present invention relates to fuel cell systems, and more particularly, to integrated bus bars for use with a fuel cell stack.

BACKGROUND OF THE INVENTION

Fuel cell systems include a fuel cell stack that produces electrical energy based on a reaction between a hydrogen-based feed gas (e.g., pure hydrogen or a hydrogen reformate) and an oxidant feed gas (e.g., pure oxygen or oxygen-containing air). In proton exchange membrane (PEM) type fuel cells, the hydrogen-based feed gas is supplied to an anode of the fuel cell and an oxidant is supplied to a cathode of the fuel cell. PEM fuel cells include a membrane electrode assembly (MEA) comprising a thin, proton transmissive, non-electrically conductive, solid polymer membrane-electrolyte having the anode on one of its faces and the cathode on the opposite face. The MEA is sandwiched between a pair of electrically conductive elements which serve as current collectors for the anode and cathode and contain appropriate channels and/or openings therein for distribution of the fuel cell's gaseous reactants over the surfaces of the respective anode and cathode catalysts. A plurality of individual fuel cells are commonly stacked together to form a PEM fuel cell stack.

Generally multiple fuel cell stacks are arranged in series and are connected via high voltage external connection wires, as illustrated in FIG. 3. The use of external connection wires increases the volume, weight and complexity of the fuel cell stack system. In particular, fuel cell stacks typically have a positive pole 102 and a negative pole 104 that are disposed at opposite ends of the fuel cell stack 100. Thus, in order to connect multiple fuel cell stacks 100, 100a in series, the external high voltage wires 106 are required to run from one end of a fuel cell stack 100 to another end of an adjacent fuel cell stack 100a as illustrated in FIG. 3. The external wires 106 are not protected by contactors, and contribute to increased electromagnetic interference (EMI) that requires shielding or other protection. The external wires 106 also contribute to additional sealing requirements. Thus, fully insulated and shielded wires require a large volume and increase the weight of the fuel cell system. Accordingly, a need exists for a system with reduced external wiring.

SUMMARY OF THE INVENTION

The present invention provides a fuel cell system having an integral electrical conduction system. The electrical energy created by a fuel cell stack is transferred from the fuel cell stack by the electrical conduction system. Both the electrical conduction system and the fuel cell stack are retained in the same housing which reduces external wiring that is required for connecting multiple fuel cell stacks.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
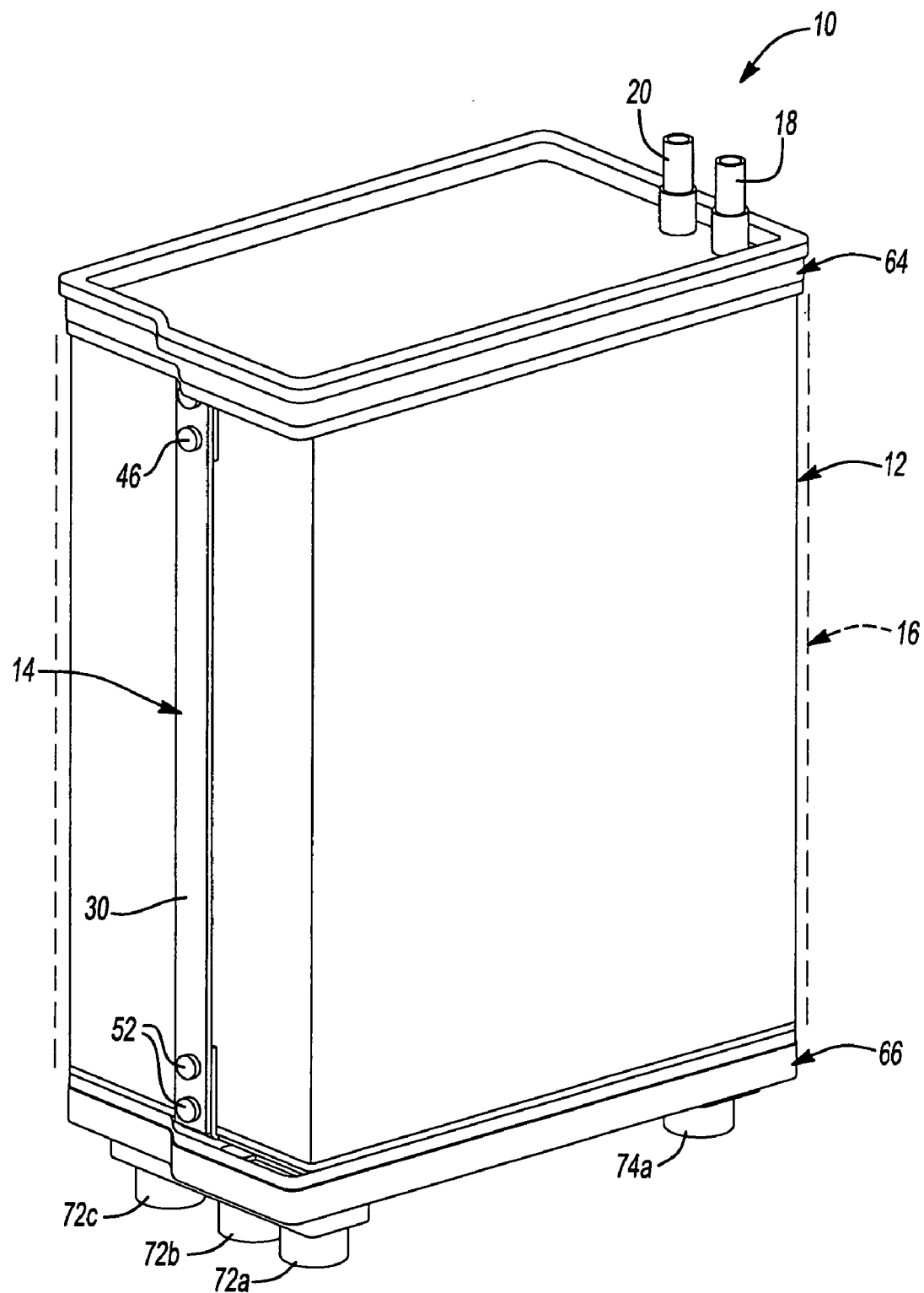
FIG. 1 is a perspective view of a fuel cell system including an integrated bus bar according to the present invention.

Referring now to FIG. 1, a fuel cell system 10 according to the principles of the present invention is shown. The fuel cell system 10 includes a fuel cell stack 12 (shown schematically) coupled to an electrical conduction system 14. The fuel cell stack 12 and the electrical conduction system 14 are both disposed in a housing 16, part of which is illustrated in phantom lines.

Figure 2:
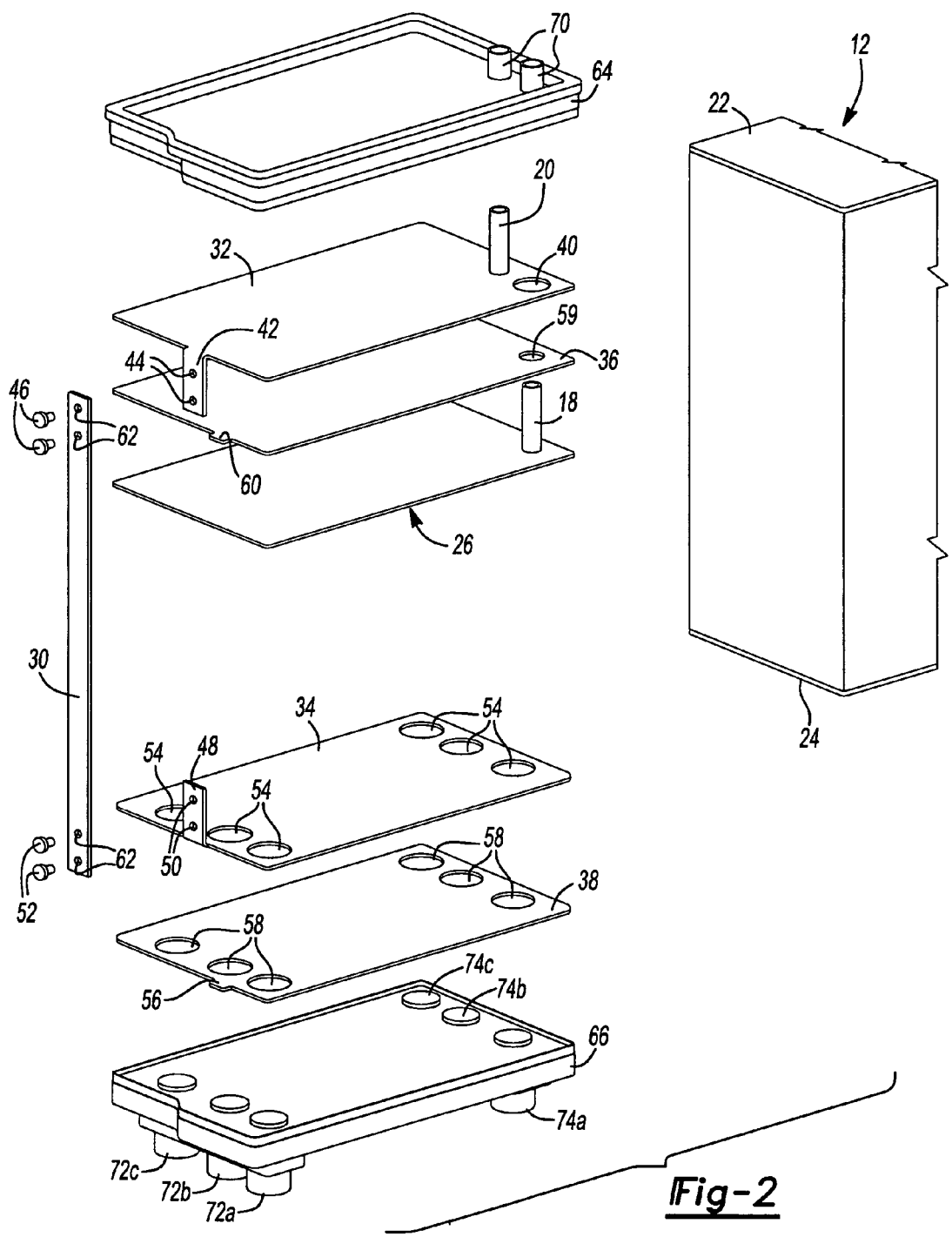
FIG. 2 is an exploded perspective view of a fuel cell system of FIG. 1.
Figure 3:
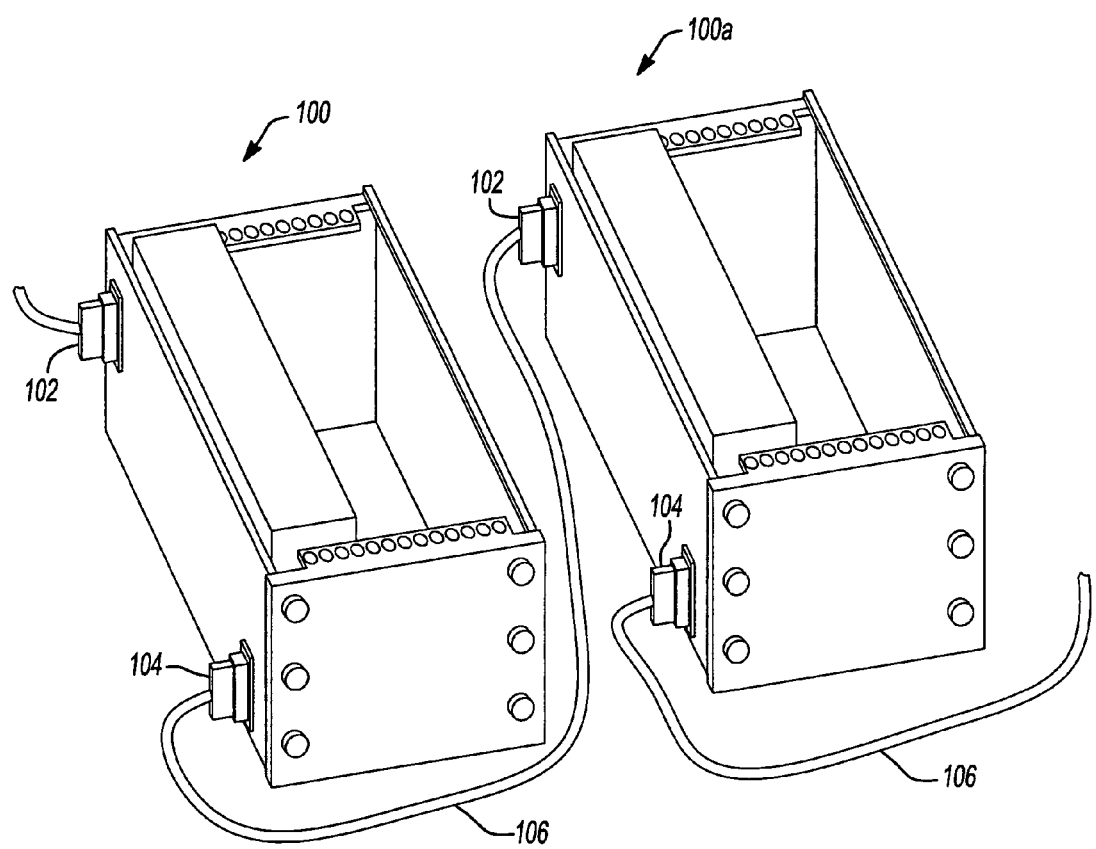
FIG. 3 is a perspective view of a prior art fuel cell system including separate fuel cell stacks connected in series with high voltage external wires.

The fuel cell stack 12 produces electrical power which is conducted out of the fuel cell stack 12 via adjacent positive and negative poles 18, 20 connected to the electrical conduction system 14. As illustrated in FIG. 2, the fuel cell stack 12 has a first end 22 and a second end 24 both of which are coupled to the electrical conduction system 14. In particular, the electrical conduction system 14 includes a first current collector plate 26 in communication with the positive pole 18 and a second current collector plate 34 in communication with the negative pole 20 as will be described in detail herein. The first current collector plate 26 is in communication with the first end 22 of the fuel cell stack 12 while the second current collector plate 34 is in communication with the second end 24 of the fuel cell stack 12. The second current collector plate 34 is coupled to the negative pole 20 via a conductive bus bar 30 which is connected to a third current collector plate 32.

The first current collector plate 26 includes the positive pole 18. The positive pole 18 is positively charged. The first current collector plate 26 is electrically conductive and can be manufactured from any electrically conductive material, such as, for example, copper. The first current collector plate 26 is in communication with the first end 22 of the fuel cell stack 12 such that the electrical energy generated by the fuel cell stack 12 passes therethrough. The first current collector plate 26 is separated from the third current collector plate 32 by a first insulating layer 36.

Both the second and third current collector plates 34, 32 are electrically conductive and can be manufactured from any electrically conductive material, such as, for example, copper. The first insulating layer 36 may be made from any substantially non-conductive material. The third current collector plate 32 is located adjacent to an upper cap 64 of the housing 16 and includes the negative pole 20 which is negatively charged. The third current collector plate 32 further includes an opening 40 for non-contact receipt of the positive pole 18 from the first current collector plate 26 therethrough. A mating flange 42 on the third current collector plate 32 couples the conductive bus bar 30 to the third current collector plate 32. Specifically, the mating flange 42 includes a plurality of openings 44 for receipt of a plurality of standard fasteners 46 therethrough. The conductive bus bar 30 is shown coupled to the mating flange 42 via the fasteners 46, however any other suitable fastening mechanism may also be used, such as, for example, welding, adhesives, crimping or rivets. The conductive bus bar 30 is further coupled to the second current collector plate 34.

The conductive bus bar 30 is joined to the second current collector plate 34 via a mating flange 48. The mating flange 48 includes a plurality of openings 50 for receipt of a plurality of fasteners 52 therethrough. The conductive bus bar 30 is shown coupled to the mating flange 48 via the fasteners 52, however any other suitable fastening mechanism may also be used, such as, for example, welding, adhesives, crimping or rivets. The second current collector plate 34 is in communication with the second end 24 of the fuel cell stack 12 and is negatively charged. The second current collector plate 34 further includes a plurality of openings 54 which serve as passages for reactant gases as described below. The second current collector plate 34 is located adjacent to a second insulating layer 38.

The second insulating layer 38 is located between the second current collector plate 34 and a lower cap 66 of the housing 16. The second insulating layer 38 has a tab 56 for securing the second insulating layer 38 to the housing 16 and a plurality of openings 58 which provide passages for reactant gases as described below. The first insulating layer 36 is located between the third current collector plate 32 and the first current collector plate 26. The first insulating layer 36 serves to insulate the first current collector plate 26 and positive pole 18 from the negatively charged third current collector plate 32 and has an opening 59 through which the positive pole 18 passes. The first insulating layer 36 also includes a tab 60 for securing the first insulating layer 36 to the housing 16.

The conductive bus bar 30 couples the third current collector plate 32 and the second current collector plate 34 together such that an electric charge can flow therethrough. The conductive bus bar 30 includes a plurality of openings 62 for the receipt of the fasteners 46 from the third current collector plate 32 and the fasteners 52 from the second current collector plate 34 therein. The conductive bus bar 30 can be made from any conductive material, such as, for example, copper.

The housing 16 has an upper cap 64, a lower cap 66, and a main body as shown in phantom lines in FIG. 1. The upper cap 64 encloses the first end 22 of the fuel cell stack 12 including the first current collector plate 26, the third current collector plate 32 and first insulating layer 36. The lower cap 66 encloses the second end 24 of the fuel cell stack 12 including second current collector plate 34 and second insulating layer 38. The upper cap 64 includes a pair of openings 70 for receipt of the positive pole 18 from the first current collector plate 26 and the negative pole 20 from the third current collector plate 32. The lower cap 66 of the housing 16 includes an anode inlet 72a for receipt of the hydrogen-based feed gas, a cathode inlet 72b for the receipt of the oxidant feed gas, and a coolant inlet 72c through which coolant fluid passes. In addition, the lower cap 66 includes an anode exhaust 74a, a cathode exhaust 74b and a coolant exhaust 74c for removing the exhaust gases and coolant from the fuel cell stack 12. Thus, the plurality of openings 54, 58 of the second current collector plate 34, and second insulating layer 38, respectively, serve as passages for the inlet and exhaust gases for the anode, cathode and coolant when positioned within the lower cap 66.

The fuel cell system 10 enables the connection of multiple fuel cell stacks 12 via the closely located positive and negative poles 18, 20 instead of through a complex bulky wiring system, reducing the amount of assembly space and overall size of the fuel cell system 10. In addition, by integrating the conductive bus bar 30 within the housing 16, the conductive bus bar 30 is protected from being touched or mishandled during assembly. The conductive bus bar 30 can also be utilized for different sizes of fuel cell stacks 12. Furthermore, both the positive pole 18 of the third current collector plate 32 and the negative pole 20 of the third current collector plate 32 can be placed at any location along the first current collection plate 26 and the third current collector plate 32, respectively, as needed.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel cell system comprising:
   a housing;
   a fuel cell stack disposed in the housing for generating electrical energy;
   an electrical conduction system including a first pole connected to a first electrical collector plate disposed at a first end of said fuel cell stack and a second pole connected to a second electrical collector plate disposed at said first end of said fuel cell stack and separated from said first collector plate by an insulating layer, one of said first and second collector plates being connected to a third electrical collector plate disposed at a second end of said fuel cell stack.

2. The fuel cell system of claim 1 wherein said housing further comprises:
   a first housing cap section adjacent to said first end of said fuel cell stack and including first and second openings for receipt of said first and second poles therethrough; and
   a second housing cap section adjacent to said second end of said fuel cell stack including at least one channel for providing at least one reactant into said fuel cell stack.

3. The fuel cell system of claim 1 wherein said first and third current collector plates each include a mounting flange for coupling to respective first and second ends of a bus bar.

4. The fuel cell system of claim 1 wherein said second pole connected to said second current collector plate extends through an opening in the first current collector plate.

5. The fuel cell system of claim 1 wherein the first current collector plate and second current collector plate are made of copper.

6. The fuel cell system of claim 1 wherein said insulating layer further comprises a flange which aids in securing said insulating layer to said housing.

7. A fuel cell system comprising:
   a housing;
   a fuel cell stack disposed in the housing for generating electrical energy and including a first end and a second end;
   an electrical system including:
      a first current collector plate coupled to the first end of the fuel cell stack for transmitting the electrical energy to a first pole; and
      a second current collection system coupled to the second end of the fuel cell stack for transmitting an electrical charge to a second pole, the second current collection system including a second current collector plate and a first insulating layer defining at least one opening through which the first pole passes, the first insulating layer located between the first current collector plate and the second current collector plate;

a third current collector plate in communication with the second end of the fuel cell stack and including at least one opening; and wherein the electrical system is retained in the housing and the first pole and second pole are located at said first end of said fuel cell stack.

8. The fuel cell system of claim 7 wherein the second current collector plate includes at least one opening through which the first pole passes and the second current collection system further comprises:

a conductive bar coupled to said second current collector plate and said third current collector plate such that an electrical charge can flow therethrough.

9. The fuel cell system of claim 8 wherein the second and third current collector plates are made of copper.

10. The fuel cell system of claim 7 wherein the first current collector plate is made of copper.

11. A fuel cell system comprising:

a fuel cell stack for generating electrical energy, the fuel cell stack having a first end and a second end; and an electrical system including:

a first current collector plate coupled to the first end of the fuel cell stack for transmitting the electrical energy to a first pole;

a second current collection system coupled to the second end of the fuel cell stack for transmitting an electrical charge to a second pole, the second current collection system including a first insulating layer defining at least one opening through which the first pole passes, the first insulating layer located between the first current collector plate and a second current collector plate; and a third current collector plate in communication with the second end of the fuel cell stack and including at least one opening.

* * * * *